Oct. 30, 1934.    O. E. NEHLER    1,978,815
HARROW TRUCK
Filed March 26, 1934

Inventor
O. E. Nehler

By Emil F. Lange
Attorney

Patented Oct. 30, 1934

1,978,815

UNITED STATES PATENT OFFICE 1,978,815

HARROW TRUCK

Oscar E. Nehler, Lincoln, Nebr.

Application March 26, 1934, Serial No. 717,455

5 Claims. (Cl. 55—103)

My invention relates to harrows and more particularly to harrow attachments for supporting the harrows for travel in a direction at right angles to the direction in which a harrow normally moves during operation.

The primary object of the invention is the provision of an attachment for supporting the harrow with its teeth above the surface of the soil and having runners on which the harrow may travel in a direction transverse to its normal direction of travel.

Another of my objects is the provision of a harrow truck for transporting the harrow through gates and over narrow bridges and culverts.

Another object which I have in view is the provision of a harrow truck having semi-automatic movement between its operative and inoperative position.

Another object of the invention is the provision of a harrow truck having both operative and inoperative positions and having latching means for releasably holding the truck attachment in either operative or inoperative position.

Having in view these objects and others which will be pointed out in the following description, I will now refer to the drawing, in which Figure 1 is a plan view of a multiple gang harrow having my truck attached to the individual harrow units.

Figure 1:
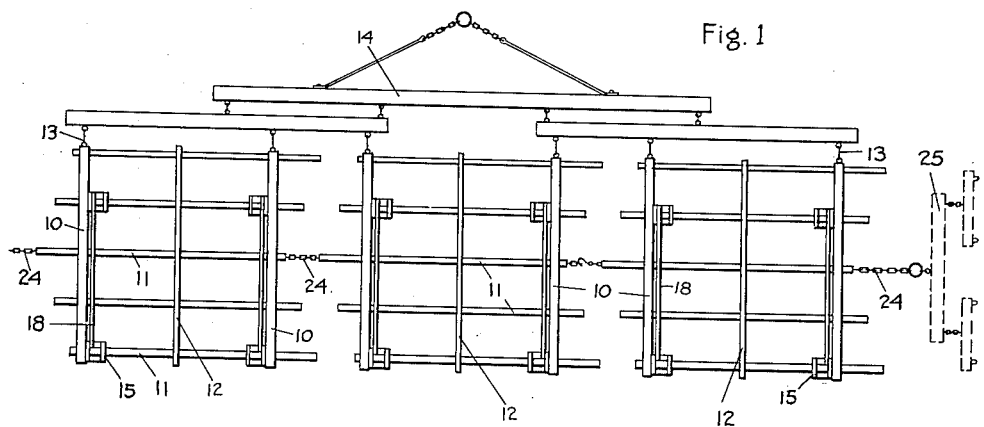

Spiked tooth harrows are nearly always made up of a number of standardized sections regardless of the make of the harrow. Such sections usually include a pair of side beams 10 with a plurality, usually five, of tooth bars 11. These tooth bars are usually journalled in the side beams 10 so that the teeth projecting through the tooth bars may be adjusted to any desired angle with respect to the surface of the soil. Such sections also usually have a center bar 12 which serves both as a brace for the section and as a support for the mechanism for adjusting the teeth. This mechanism is not shown in my drawing for the reason that it is well known to all those skilled in the art and for the further reason that it is not related to my invention. The side beams 10 are provided with draft connections 13 at their forward extremities so that they may be connected in multiple with any suitable evener 14. This evener is of simple construction since the harrow has no side draft.

Figure 4:
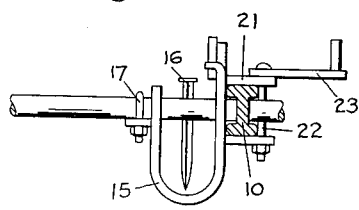
Figure 4 is a view in end elevation showing one of the runners and also the latch for maintaining the truck in its inoperative position.

My invention includes runners 15 which are adapted to be secured to the tooth bars 11. These runners are U-shaped in form and they are provided with apertures sufficiently large to loosely receive the end portions of the tooth bars 11. The runners 15 are also long enough to support the harrow frame even when the teeth 16 are perpendicular to the plane of the harrow frame. They usually straddle a tooth as shown in Figure 4. For preventing the sliding of the runners 15 on their tooth bars 11, I secure a U-bolt 17 to the tooth bars and contiguous to the runner. The runner thus has pivotal movement about the tooth bar as an axis but it is prevented from sliding lengthwise thereon.

I contemplate the use of two runners 15 adjacent each side beam 10 of a section. A link 18 is pivotally connected to both runners 15 of a pair of runners. The links 18 have downturned goose necks at their opposite extremities so that the two runners of a pair will always move in unison. The runners 15 are furthermore provided with stop members 19 for limiting the downward movement of the runners 15 to their vertical position.

Figure 2:
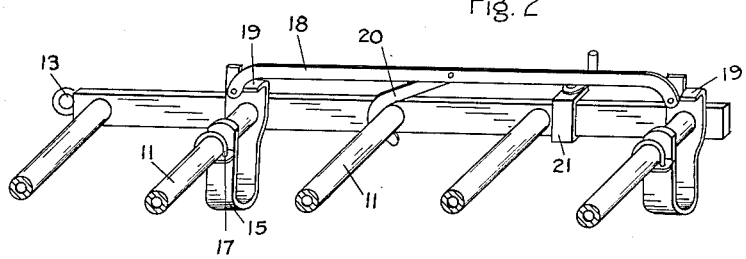
Figure 2 is a view in perspective and partly in section showing one of the side beams of the harrow unit and showing particularly the details of my harrow truck in operative position.
Figure 3:
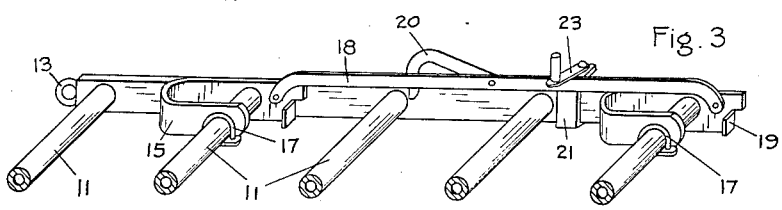
Figure 3 is a view similar to Figure 2 but showing the harrow truck in its inoperative position.

The runners 15 have two definite positions as shown in Figures 2 and 3 respectively. The Figure 2 position is the operative position for the runners. For holding the runners in this position I provide a latch 20 which is pivotally connected to the link 18 and which is adapted to engage one of the tooth bars 11 as shown in Figure 2 to hold it firmly in position. In the inoperative position in Figure 3, the runners 15 are in substantially horizontal position. The latch for holding them in horizontal position includes a clevis 21 having a bolt 22 with the latch proper 23. The latch 23 may be swung about the bolt 22 as an axis to engage the upper edge of the link 18 which prevents the falling of the runners 15.

The middle tooth bars 11 are provided with draft chains 24 or other suitable draft devices. In the normal operation of the harrow the draft devices 24 between adjacent sections are releasably connected together so that all of the sections will operate in unison regardless of the contour of the surface of the soil. For transportation of the harrow as a whole in a direction at right angles to its normal direction of travel either end draft connection 24 may be connected with the doubletree as shown in dotted lines 25 or with any other suitable connection for pulling the harrow.

In use the harrow units or gangs are connected in multiple as shown in Figure 1. The number of units depends largely on the amount of the tractive power as it is evident that a heavy tractor can operate more units than can a team of horses. The draft connections 24 between adjacent units are united to each other so as to give great flexibility to the movement of the units over uneven soil surfaces. In the operative position of the harrow the runners 15 are in their inoperative position which is shown in Figure 3. This is the position which the runners 15 will occupy until the harrow is to be transported.

When it is ready for transportation the latches 23 are released and the harrows are caused to be moved forwardly a slight distance. The release of the latches 23 permits the runners 15 to drop into contact with the soil whereupon the draft of the harrows will cause the runners 15 to act as levers to raise the frames of the harrow units. When the runners 15 assume a substantially vertical position or immediately before they assume the vertical position, the stops 19 will prevent any further movement of the runners 15. During the movement of the runners from the Figure 3 to the Figure 2 position the latches 20 will ride over one of the tooth bars 11 and fall into engagement with the tooth bar at the moment when the stops 19 prevent further movement. At this point the draft is stopped as any further movement of the draft would merely cause the runners 15 to cut a gash in the soil surface. The draft is then detached from the draft device 14 and attached to the draft device 25 at either end of the harrow. The harrow may then be transported over roads, bridges, and through gates because its width is less than the width of the gate opening.

The operation is reversed when taking the harrow to the field. The draft is applied to the draft appliance 25 until the field is reached and it is then transferred to the draft appliance 14. When beginning work the latches 20 are first released and downward pressure is applied on the links 18 to bring them into the position shown in Figure 3. The latches 23 are then moved into their inoperative position which holds the runners 15 in the substantially horizontal position as shown in Figure 3 and which prevents the falling of the runners 15 during the operation of the harrow as a harrow.

The harrow truck will operate regardless of the adjustment of the tooth bars 11. In nearly all spike tooth harrows the tooth bars 11 may be adjusted to bring the teeth 16 into either a vertical operative position or a horizontal inoperative position or the adjustment may be made to incline the teeth 16 either forwardly or rearwardly. If left in the full operative position as shown in Figure 4 they are still above the surface of the soil since the runners 15 are longer than the operative portions of the teeth 16.

Having thus described my invention in such full, clear, and exact terms that its construction and operation will be readily understood by others skilled in the art to which it pertains, what I claim as new and desire to secure by Letters Patent of the United States is:

1. A harrow truck including a plurality of U-shaped runners adapted for pivotal attachment to the tooth bars of a harrow, means for latching said runners in substantially horizontal position, said runners being adapted for automatic pivotal movement when said latching means is released whereby said runners will first come into contact with the surface of the soil and then be carried to vertical position by the draft of the harrow, a stop for limiting the downward arcuate movement of said runners to substantially vertical position, and means for latching said runners in substantially vertical position.

2. A harrow truck including a plurality of U-shaped runners adapted for pivotal attachment to the tooth bars of the harrow, said runners being arranged in pairs in parallelism with the line of draft of the harrow and being adapted to fall with their free extremities into contact with the surface of the soil whereby the forward travel of the harrow will cause said runners to assume a substantially vertical position to support the harrow, a link connecting the runners of each pair, and an automatic latch for maintaining said runners in operative position to support the harrow.

3. A harrow truck including a plurality of U-shaped runners to straddle teeth of the harrow and adapted for pivotal attachment to the tooth bars of a harrow to fall about their pivotal points, means for preventing sliding movement of said runners, said runners being adapted in their falling pivotal movement to lift the entire harrow in response to the draft of the harrow, means for limiting the lifting movement of said runners to substantially vertical position of said runners, an automatic latch for maintaining the harrow in lifted position on said runners, said runners being of a length to lift the harrow with the points of the teeth above the surface of the soil and being adapted for positioning transversely of the harrow whereby the harrow may be transported in either direction at right angles to its operative direction of draft.

4. A harrow truck including a plurality of U-shaped runners adapted for pivotal attachment to the tooth bars of a harrow, said runners being adapted to fall forwardly and downwardly with their free extremities in contact with the surface of the soil whereby the forward travel of the harrow will cause said runners to assume a substantially vertical position to support the harrow, stops for limiting the downward movement of said runners, and a latch for maintaining said runners in vertical position.

5. A harrow truck including a pair of runners adapted for pivotal attachment to a pair of tooth bars of a harrow to project in both directions therefrom, a link connecting said runners, stops on said runners and cooperating with said link to limit the pivotal movements of said runners to the quadrant between the horizontal and vertical positions of said runners, and latches for maintaining said runners in either their horizontal or vertical position, said latches cooperating with said link.

OSCAR E. NEHLER.